United States Patent
Enjoji et al.

(10) Patent No.: US 7,348,083 B2
(45) Date of Patent: Mar. 25, 2008

(54) FUEL CELL SYSTEM

(75) Inventors: Naoyuki Enjoji, Utsunomiya (JP);
Norimasa Kawagoe, Utsunomiya (JP);
Masaharu Suzuki, Utsunomiya (JP);
Yoshinori Wariishi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 481 days.

(21) Appl. No.: 10/800,168

(22) Filed: Mar. 12, 2004

(65) Prior Publication Data

US 2004/0185315 A1 Sep. 23, 2004

(30) Foreign Application Priority Data

Mar. 18, 2003 (JP) ............................. 2003-073503
Feb. 10, 2004 (JP) ............................. 2004-032999

(51) Int. Cl.
H01M 8/04 (2006.01)
H01M 2/00 (2006.01)
H01M 2/02 (2006.01)

(52) U.S. Cl. ..................... 429/22; 429/23; 429/25; 429/34; 429/17

(58) Field of Classification Search ................. 429/22, 429/23, 25, 34, 17
See application file for complete search history.

(56) References Cited

U.S. PATENT DOCUMENTS

2001/0010875 A1* 8/2001 Katagiri et al. ............... 429/22
2002/0006537 A1* 1/2002 Kobayashi et al. ........... 429/26
2002/0164509 A1* 11/2002 Wheat et al. .................. 429/22

FOREIGN PATENT DOCUMENTS

| DE | 10126090 A1 | 2/2002 |
| DE | 10219626 A1 | 11/2002 |
| JP | 2002-093438 | 3/2002 |
| JP | 2002-260698 | 9/2002 |

OTHER PUBLICATIONS

German Office Action for Application No. 10 2004 013 487.1-45, dated Nov. 14, 2006.

* cited by examiner

Primary Examiner—Gregg Cantelmo
Assistant Examiner—Eugenia Wang
(74) Attorney, Agent, or Firm—Lahive & Cockfield, LLP; Anthony A. Laurentano, Esq.

(57) ABSTRACT

A humidity sensor is disposed in a circulation passage as a passage of a hydrogen gas supplied to an anode of a fuel cell stack. A load current setting unit determines a level of electrical current supplied to a load. A flow rate controller controls a compressor based on the humidity detected by the humidity sensor and the load current determined by the load current setting unit to regulate a flow rate of the air supplied to a cathode of the fuel cell stack for maintaining the humidity of the hydrogen gas within a predetermined range less than 100%. The fuel cell stack generates the load current efficiently without discharging the hydrogen gas to the outside.

8 Claims, 8 Drawing Sheets

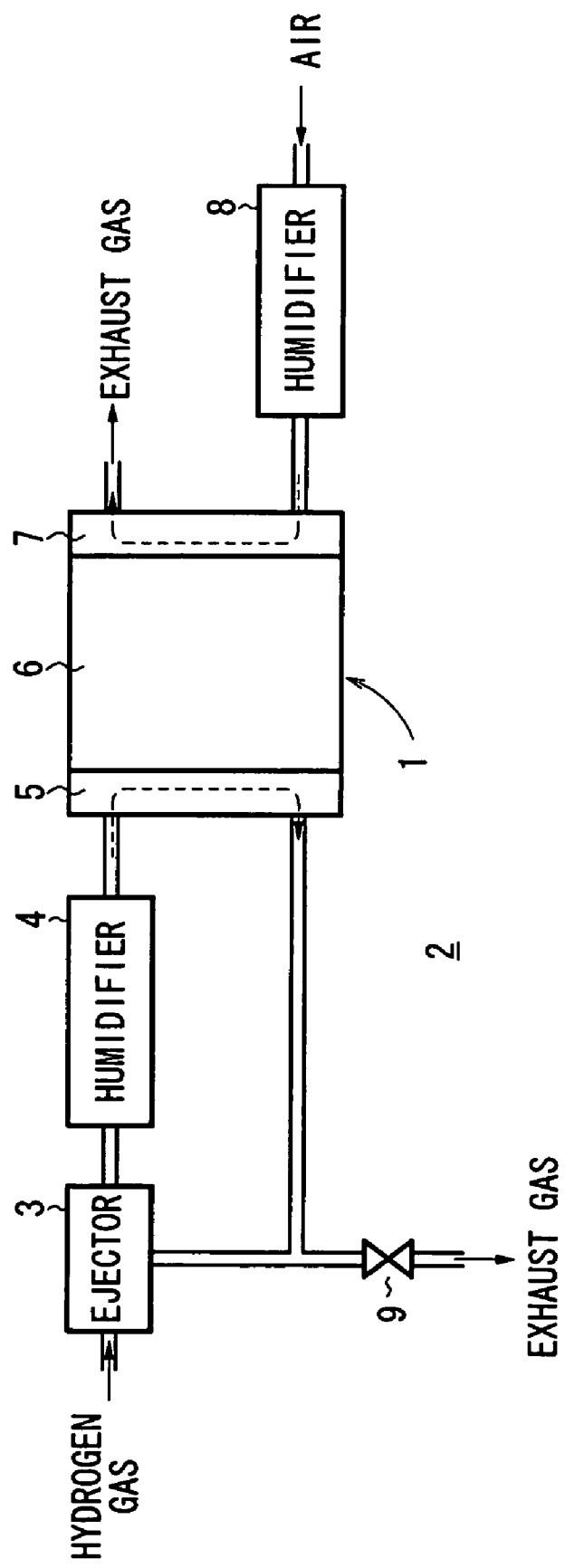

FUEL CELL SYSTEM

BACKGROUND OF THE INVENTION

1. Field of the Invention

The present invention relates to a fuel cell system including a fuel cell. The fuel cell has an anode and a cathode. A fuel gas is supplied to the anode, and an oxygen-containing gas is supplied to the cathode for inducing electrochemical reactions at the anode and the cathode, and electricity generated in the electrochemical reactions is supplied to a load.

2. Description of the Related Art:

For example, a solid polymer electrolyte fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly is interposed between a pair of separators. The membrane electrode assembly and the separators make up a unit cell for generating electricity.

FIG. 8 is a view schematically showing a fuel cell system 2 including such a fuel cell stack 1 (see Japanese Laid-Open patent publication No. 2002-93438). In the fuel cell system 2, a fuel gas such as a hydrogen-containing gas is supplied to a humidifier 4 through an ejector 3. After the fuel gas is humidified to have a predetermined humidity, the humidified fuel gas is supplied to the anode 5. The catalyst of the anode 5 induces a chemical reaction of the fuel gas to split the hydrogen molecule into hydrogen ions (protons) and electrons. The hydrogen ions move toward the cathode 7 through the electrolyte membrane 6, and the electrons flow through an external circuit to the cathode 7, creating a DC electric current supplied to a load. An oxygen-containing gas such as air is supplied to a humidifier 8. After the oxygen-containing gas is humidified to have a predetermined humidity, the humidified oxygen-containing gas is supplied to the cathode 7. At the cathode 7, the hydrogen ions from the anode 5 combine with the oxygen in the oxygen-containing gas to produce water. After the oxygen in the oxygen-containing gas is partially consumed in the chemical reaction, the oxygen-containing gas and the water vapor produced in the chemical reaction are discharged as the exhaust gas from the fuel cell stack 1.

The humidifiers 4 and 8 are used for humidifying the hydrogen gas and the air to keep the electrolyte membrane at a predetermined humidity suitable for power generation. If the water is trapped in the passage near the anode 5, the hydrogen gas may not be sufficiently supplied to the anode 5, and the voltage drop may occur undesirably. In an attempt to solve the problem, a valve 9 is provided in the circulation passage of the hydrogen gas. The valve 9 is opens in a certain condition for discharging the exhaust gas containing water so that the water is not trapped in the passage, and the desired voltage can be maintained.

The unconsumed hydrogen in the exhaust gas is wastefully discharged from the anode 5 to the outside. The loss of the unconsumed hydrogen lowers the fuel economy. Thus, it is necessary to suppress the hydrogen concentration in the hydrogen gas (exhaust gas) below a predetermined level. The optimum condition for discharging the minimum amount of the hydrogen gas needs to be determined empirically through various experiments. Further, in the conventional fuel cell system, a mechanism for decreasing the hydrogen concentration in the exhaust gas, a mechanism for diluting the hydrogen gas, and a mechanism for combusting the hydrogen gas are required.

SUMMARY OF THE INVENTION

A general object of the present invention is to provide a fuel cell system in which stable power generation is carried out continuously without discharging any exhaust gas from the anode side.

A main object of the present invention is to provide a fuel cell system in which no hydrogen-containing gas is discharged to the outside wastefully, and the hydrogen-containing gas is utilized efficiently for carrying out the economical power generation.

Another object of the present invention is to provide a simple and economical fuel cell system in which no humidifier for humidifying the hydrogen-containing gas is provided on the anode side.

Still another object of the present invention is to provide a simple and economical fuel cell system in which no mechanism for diluting or combusting the hydrogen-containing gas is provided.

According to the present invention, the flow rate of the oxygen-containing gas supplied to the cathode is controlled for regulating the amount of water diffused from the cathode toward the anode, and the amount of water (water molecules) dragged from the anode to the cathode by the hydrogen ions (protons). Water condensation at the anode side is prevented, and the electrolyte membrane is suitably humidified by the water diffused from the cathode to the anode. Thus, no humidifier is required for humidifying the hydrogen-containing gas. The desired amount of hydrogen-containing gas is supplied to the anode for carrying out the stable power generation.

According to the present invention, the humidity of the hydrogen-containing gas is detected accurately by a humidity sensor, and the humidity is controlled within a predetermined range less than 100%.

According to the present invention, the hydrogen-containing gas is circulated to supply the unconsumed hydrogen gas to the anode. Thus, the hydrogen-containing gas is not discharged to the outside. The hydrogen in the hydrogen-containing gas is used efficiently.

According to the present invention, the flow rate of the oxygen-containing gas supplied to the cathode and the flow rate of the hydrogen-containing gas supplied to the anode through the circulation passage are controlled for controlling the humidity of the hydrogen-containing gas in a predetermined range such that hydrogen-containing gas is not saturated with water at the anode. The exhaust gas is not discharged from the anode, and the desired amount of the hydrogen-containing gas is supplied to the anode for carrying out the power generation stably.

According to one aspect of the present invention, the operation of humidifying the oxygen-containing gas supplied to the cathode is controlled by operating the switching valve connected to the bypass passage disposed in parallel to the humidifier. Thus, the amount of water diffused from the cathode to the anode, and the amount of water moving from the anode to the cathode by the hydrogen ions are adjusted.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a block diagram showing a conventional fuel cell system.

DESCRIPTION OF THE PREFERRED EMBODIMENTS

Figure 1:
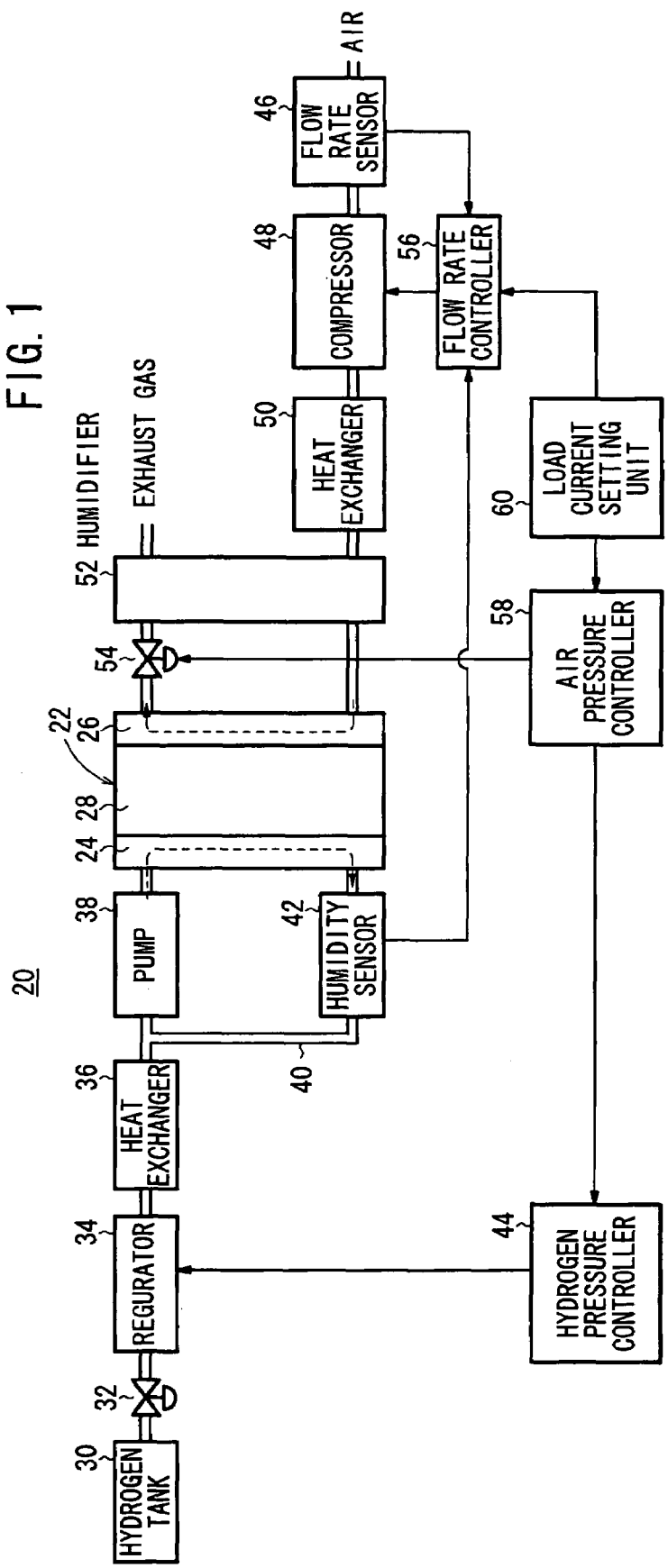
FIG. 1 is a block diagram schematically showing a fuel cell system according to a first embodiment of the present invention.

FIG. 1 is a block diagram showing a fuel cell system 20 according to a first embodiment of the present invention. In FIG. 1, double lines denote gas passages, and single lines denote electrical signal lines.

The fuel cell system 20 includes a fuel cell stack 22. A fuel gas such as a hydrogen gas and an oxygen-containing gas such as air are supplied to the fuel cell stack 22 for generating electrical energy supplied to a load. The fuel cell stack 22 is formed by stacking a plurality fuel cells each including an anode 24, a cathode 26, and electrolyte membrane 28 interposed between the anode 24 and the cathode 26. The hydrogen gas is supplied to the anode 24, and the air is supplied to the cathode 26.

The hydrogen gas is stored in a tank 30. The hydrogen gas is supplied from the tank 30 through a valve 32, a regulator 34, a heat exchanger 36, and a pump 38 to an inlet of the anode 24. The pump 38 is also connected to an outlet of the anode through a circulation passage 40. A humidity sensor 42 for detecting humidity at the anode 24 is disposed in the circulation passage 42. The valve 32 is opened when the power generation is started, and closed when the power generation is finished. The regulator 34 controls the pressure of the hydrogen gas supplied to the anode 24 according to a control signal (control value) outputted from a hydrogen pressure controller 44. The temperature of the hydrogen gas supplied to the anode 24 is optimized for power generation by the heat exchanger 36. The pump 38 connected to the circulation passage 40 is used for circulating the hydrogen gas discharged from the outlet of the anode 24 to the inlet of the anode 24. The hydrogen in the hydrogen gas (fuel gas) is partially consumed at the anode 24. The hydrogen which is not consumed at the anode 24 is supplied again to the inlet of the anode 24.

The air is supplied to a compressor 48 through a flow rate sensor 46. The air is pressurized by the compressor 48, and supplied to the inlet of the cathode 26 through a heat exchanger 50 and a humidifier 52. The outlet of the cathode 26 is connectable to the outside through a valve 54 and the humidifier 52. The flow rate sensor 46 detects the flow rate of the air supplied to the cathode 26. The compressor 48 regulates the flow rate of the air supplied to the cathode 26 according to a control signal (control value) supplied to a flow rate controller 56. The temperature of the air supplied to the cathode 26 is optimized for power generation by the heat exchanger 50. The humidifier 52 humidifies the air using the water in the exhaust gas discharged from the cathode 26. The opening degree of the valve 54 is controlled by a control signal (control value) outputted from an air pressure controller 58 so that the pressure of the air supplied to the cathode 26 can be regulated.

The fuel cell system 20 has a load current setting unit 60 for determining the load current corresponding to the amount of electrical energy required by the load. The load current setting unit 60 controls the air pressure controller 58 for supplying the pressurized air to the cathode 26 for generating the required amount of electrical energy supplied to the load. The air pressure controller 58 controls the hydrogen pressure controller 44 for supplying the hydrogen gas to the anode 24 such that the ratio of the pressure of the hydrogen gas supplied to the anode 24 with respect to the pressure of the air supplied to the cathode 26 is optimized. Further, the load current setting unit 60 controls the flow rate controller 56 based on the load current for regulating the flow rate of the air such that the humidity at the anode 24 is optimized.

The fuel cell system 20 according to the first embodiment is basically constructed as described above. Next, operation of the fuel cell system 20 will be described.

Firstly, the load current setting unit 60 determines a target load current supplied to the load. Based on the target load current determined by the load current setting unit 60, the air pressure controller 58 adjusts the opening degree of the valve 54 for controlling the pressure of the air supplied to the fuel cell stack 22. The hydrogen pressure controller 44 controls the regulator 34 to adjust the pressure of the hydrogen gas supplied to the anode 24 such that the ratio of the pressure of the hydrogen gas with respect to the pressure of the air is regulated at the optimized level. The flow rate controller 56 control the compressor 48 to adjust the flow rate of the air supplied to the fuel cell stack 22 based on parameters such as the flow rate of the air detected by the flow rate sensor 46, and the humidity in the hydrogen gas detected by the humidity sensor 42.

The hydrogen gas stored in the hydrogen tank 30 is supplied to the regulator 34 by opening the valve 32. After the pressure of the hydrogen gas is controlled by the regulator 34, the hydrogen gas is supplied to the heat exchanger 36. After the temperature of the hydrogen gas is controlled by the heat exchanger 36, the hydrogen gas is supplied to the anode 24 for each of the fuel cells of the fuel cell stack 22 through the pump 38. After the flow rate and the pressure of the air are regulated based on the load current determined by the load current setting unit 60, the temperature of the air is controlled by the heat exchanger 50, and the humidity of the air is controlled by the humidifier 52. Then, the air is supplied to the cathode 26 for each of the fuel cells of the fuel cell stack 22.

The hydrogen gas supplied to the fuel cell stack 22 is split into hydrogen ions (protons) and electrons in the electrochemical reaction induced by the catalyst layer of the anode 24. The hydrogen ions move toward the cathode 26 through the electrolyte membrane, and the electrons flow through an external circuit to the cathode 26, creating an electrical current supplied to the load. The air is supplied to the cathode 26. At the cathode 26, the hydrogen ions from the anode 24 combine with the electrons and oxygen in the air to produce water.

After the oxygen is partially consumed at the cathode 26, the remaining air and the water produced at the cathode 26 are discharged to the outside as an exhaust gas through the valve 54 and the humidifier 52. The humidifier 52 uses the water in the exhaust gas for humidifying the air supplied to the cathode 26. In this manner, the electrolyte membrane 28 of the fuel cell stack 22 is humidified suitably by the water in the air. The water in the air, and the water produced during the power generation are diffused to the anode 24 for humidifying the hydrogen gas, and the humidified hydrogen gas is also utilized to keep the humidity at the electrolyte membrane 28 at the desired level. Consequently, the power generation is carried out reliably at the desired voltage level. After the hydrogen is partially consumed at the anode 24, the hydrogen gas is circulated by the pump 38 to use the remaining hydrogen in the hydrogen gas. Thus, the efficient power generation is carried out continuously.

In the first embodiment, the flow rate of the air supplied to the fuel cell stack 22 is regulated by the flow rate controller 56. Without any humidifier in the system for supplying the hydrogen gas to the anode 24, the humidity of the hydrogen gas is maintained at the optimum level. The hydrogen gas is not discharged wastefully to the outside. The power generation for supplying electrical energy to the load is carried out stably at the desired voltage level.

Figure 2:
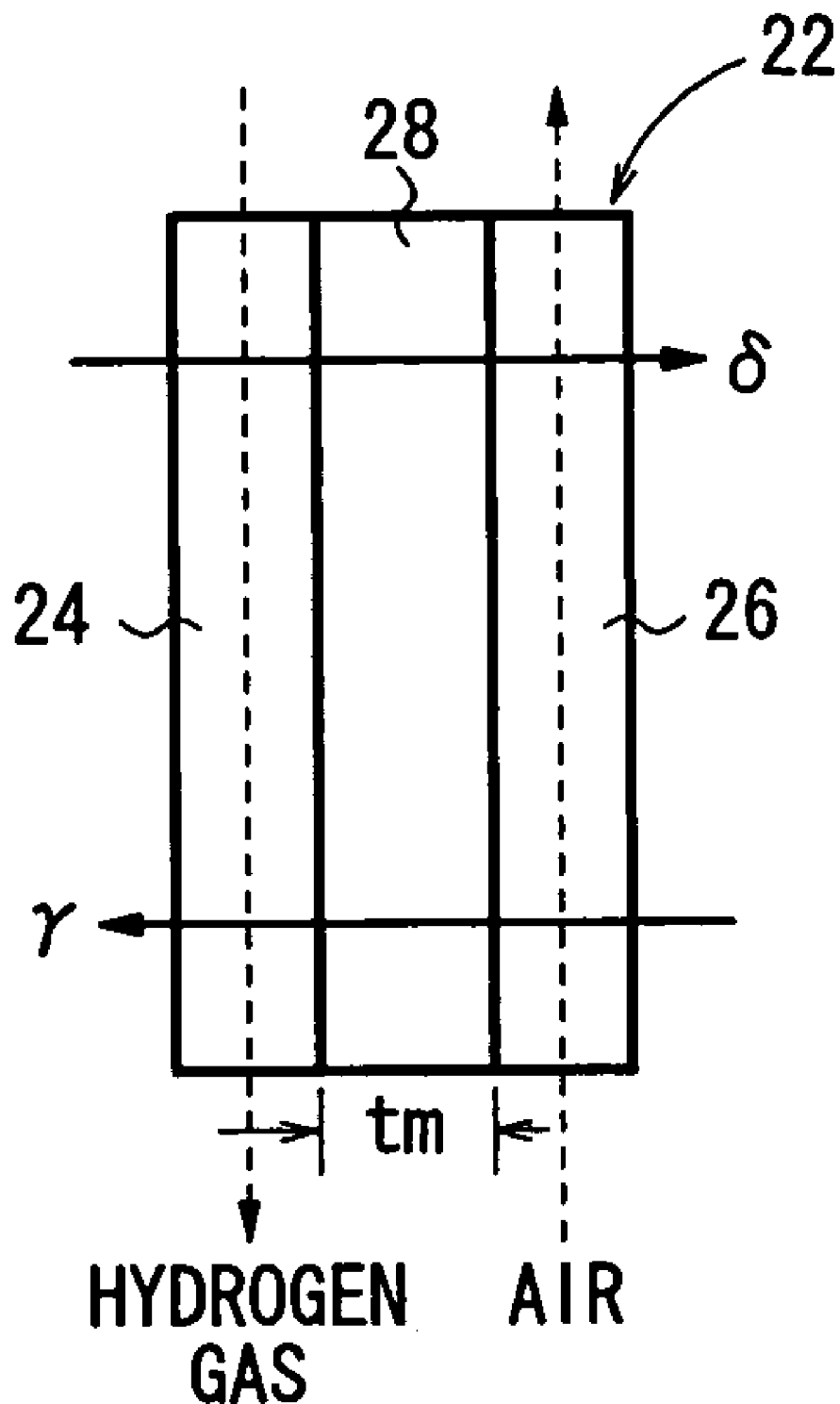
FIG. 2 shows a model of a fuel cell stack.

FIG. 2 shows a model of the fuel cell stack 22. The amount of water diffused from the cathode 26 to the anode 24 by back diffusion is calculated by the following known equation (1):

$$\gamma = Dw(Hm) \times (Cwc(Hc) - Cwa(Ha))/tm \qquad (1)$$

where tm is the thickness of the electrolyte membrane 28, $Dw(Hm)$ is the water diffusion coefficient in the electrolyte membrane 28, $Cwc(Hc)$ is the water density at the interface between the cathode 26 and the electrolyte membrane 28, $Cwa(Ha)$ is the water density at the interface between the anode 24 and the electrolyte membrane 28. The water diffusion coefficient $Dw(Hm)$ depends on the humidity $Hm$ in the membrane electrode assembly 28. The water density $CwC(Hc)$ depends on the average humidity at the cathode 26 (cathode humidity $Hc$). The water density $Cwa(Ha)$ depends on the average humidity at the anode 28 (anode humidity $Ha$).

The hydrogen ions (protons) produced at the anode 24 move toward the cathode 26 together with water molecules. The amount of water moving from the anode 24 to the cathode 26 by the electro-osmotic drag of water is calculated by the following known equation (2):

$$\delta = nd(Hm) \times M(I) \qquad (2)$$

where $nd(Hm)$ is the number of water molecules accompanying one hydrogen ion, $M(I)$ is the mole number of the moving hydrogen ions. The number of water molecules $nd(Hm)$ depends on the humidity $Hm$ in the electrolyte membrane 28, and the mole number of the moving hydrogen ions $M(I)$ depends on the load current I generated by the fuel cell stack 22.

The hydrogen gas in the circulation passage 40 including the passage for supplying the hydrogen gas to the anode 24 needs to be humidified suitably. Thus, the humidity sensor 42 is provided in the circulation passage 40 for controlling the average humidity of the hydrogen gas within a predetermined desired range less than 100%.

The average humidity (anode humidity Ha) of the hydrogen gas is determined by the difference ($\gamma - \delta$) between the amount of water diffused from the cathode 26 to the anode 24 by back diffusion, and the amount of water moving from the anode 24 to the cathode 26 by the electro-osmotic drag of water. The difference ($\gamma - \delta$) is calculated using the equations (1), and (2), and depends on the average humidity Hc of the air supplied to the cathode 26, and also depends on the load current I generated by the fuel cell stack 22. The average humidity Hc at the cathode 26 can be controlled by regulating the flow rate of the air supplied to the cathode 26 from the compressor 48. When the flow rate of the air supplied to the cathode 26 is increased, the water produced at the cathode 26 and the exhaust gas are discharged to the outside efficiently. Therefore, the average humidity Hc decreases. When the flow rate of the air supplied to the cathode 26 is decreased, the water is not discharged smoothly to the outside. Therefore, the average humidity Hc increases.

Figure 3:
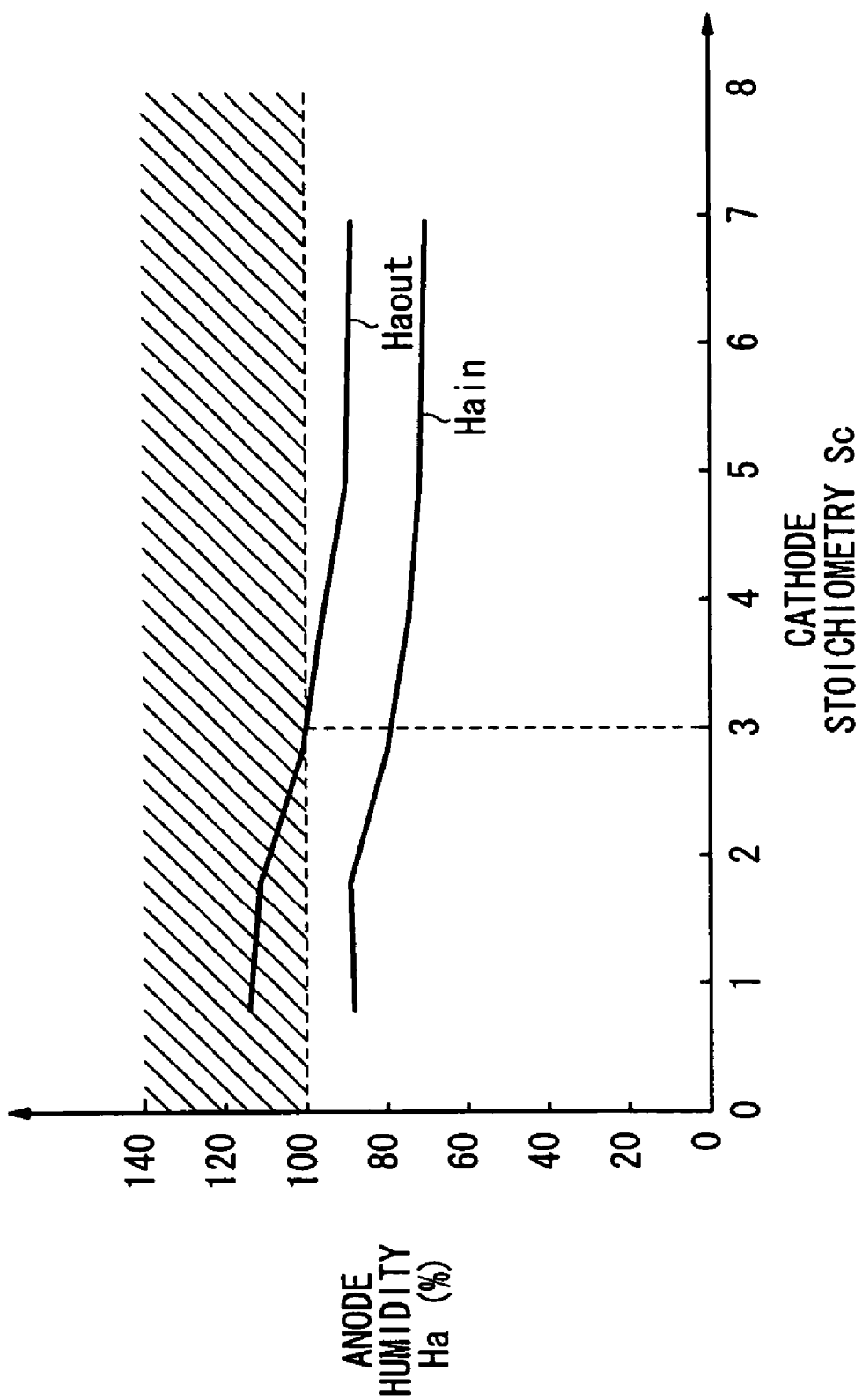
FIG. 3 is a view showing a relationship between stoichiometry at a cathode, and humidity at an anode.

FIG. 3 is a view showing a relationship between stoichiometry Sc at the cathode 26, and humidity at the anode 24 (anode humidity Ha) when load current I1 is generated. The stoichiometry Sc at the cathode 26 is calculated based on the amount of the air supplied to cathode 26 (the amount of air supplied to the cathode 26/the amount of oxygen in the air consumed by power generation). The average humidity Hain at an inlet of the anode 24, and the average humidity Haout at an outlet of the anode 24 are used as the anode humidity Ha.

Figure 4:
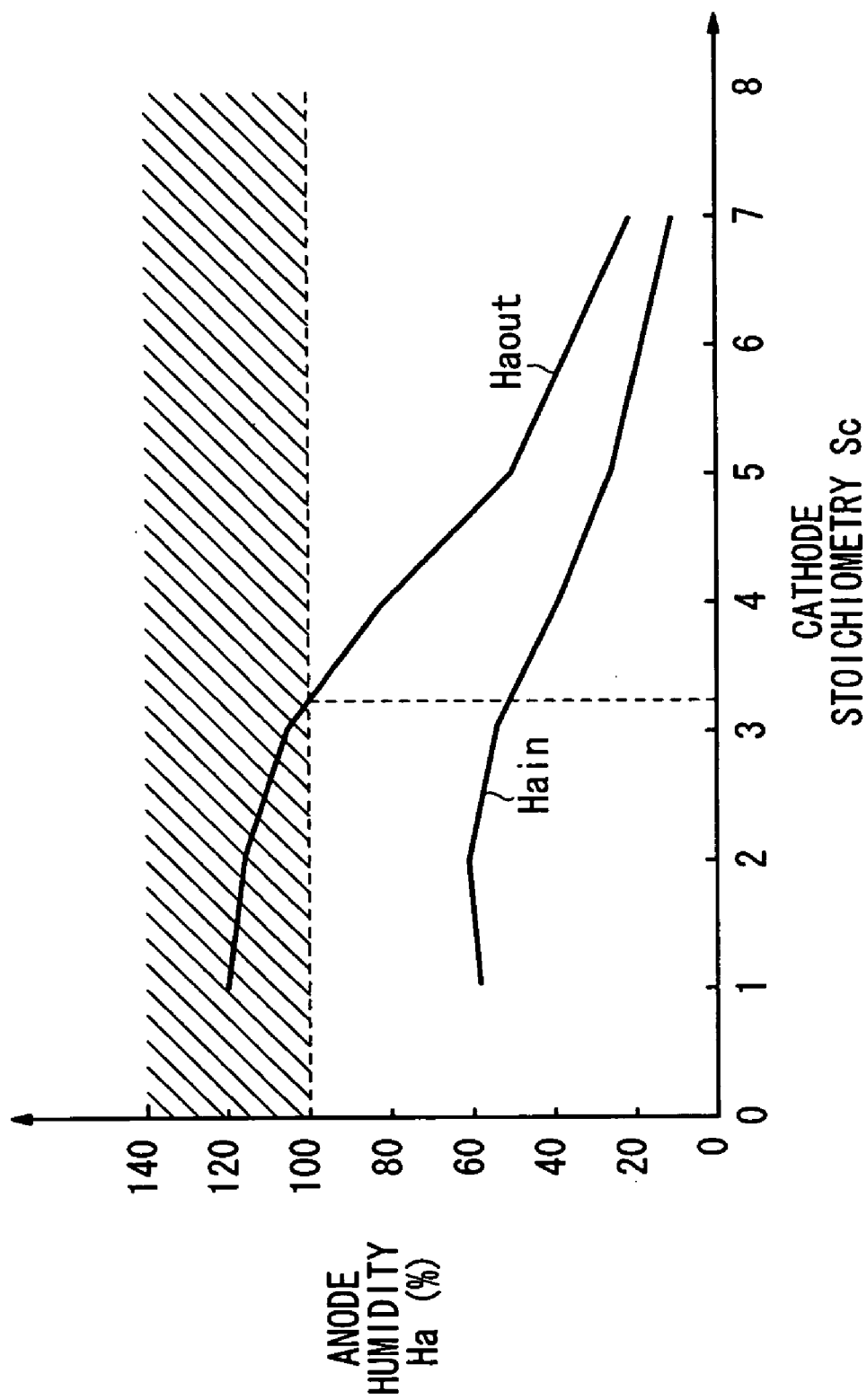
FIG. 4 is a view showing another relationship between stoichiometry at the cathode and humidity at the anode.

FIG. 4 is a view showing another relationship between stoichiometory Sc at the cathode 26 and humidity at the anode (anode humidity Ha) when load current I2 is generated. The value of the load current I2 is greater than the value of the load current I1. Likewise, the average humidity Hain at an inlet of the anode 24, and the average humidity Haout at an outlet of the anode 24 are used as the anode humidity Ha.

The flow rate controller 56 uses the data of the relationships shown in FIGS. 3 and 4 stored as a look up table, for example for controlling the compressor 48. Specifically, the flow rate controller 56 controls the compressor 48 based on the value of the load current I determined by the load current setting unit 60, and the average humidity of the hydrogen gas at the anode 24 (anode humidity Ha) detected by the humidity sensor 42. The compressor 48 regulates the flow rate of the air supplied to the cathode 26 such that stoichiometory Sc has a predetermined value to maintain the anode Humidity Ha within a predetermined desired range (e.g., 70 to 80%) less than 100%. Both of the cathode 26 and the anode 24 of the fuel cell stack 22 are humidified suitably by the water supplied to the cathode 26. Consequently, the fuel cell stack 22 can carry out the power generation efficiently.

The flow rate of the air supplied to the cathode 26 is regulated such that the cathode stoichiometry SC has a sufficient value to enable the fuel cell stack 22 to generate the required load current I. At the same time, the cathode stoichiometry SC is regulated such that the anode humidity Ha has a high value to minimize the electrical energy required for driving the compressor 48. Thus, the electrical energy generated in the fuel cell stack 22 is not used wastefully.

Figure 5:
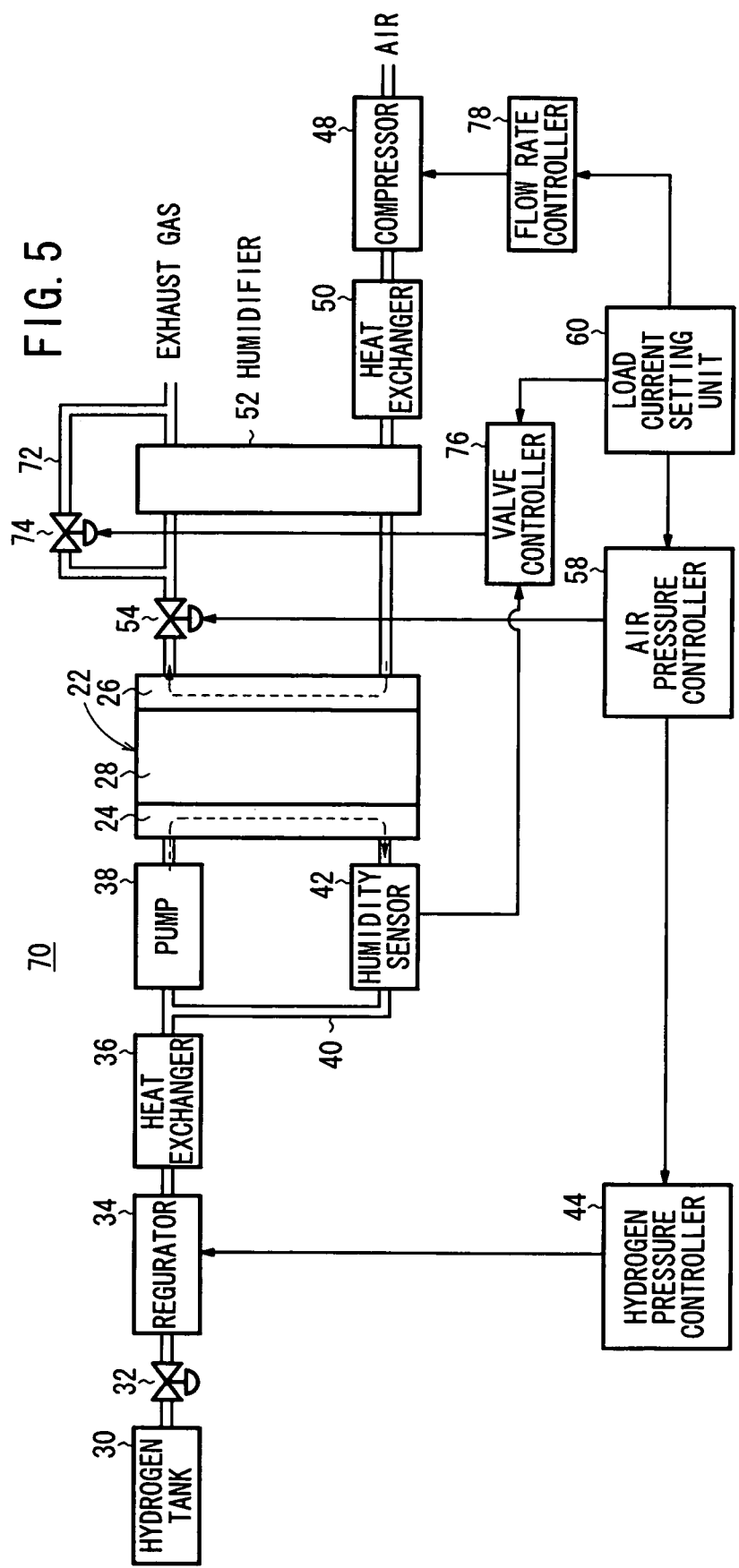
FIG. 5 is a block diagram showing a fuel cell system according to a second embodiment of the present invention.

FIG. 5 is a view showing a fuel cell system 70 according to a second embodiment of the present invention. The constituent elements that are identical to those of the fuel cell system 20 shown in FIG. 1 are labeled with the same reference numeral, and description thereof will be omitted.

The fuel cell system 70 has a bypass passage 72 for discharging the exhaust gas from the outlet of the cathode 26 of the fuel cell stack 22 without passing through the humidifier 52. A switching valve 74 is disposed in the bypass passage 72. The switching valve 74 is opened or closed by a valve controller 76 based on the average humidity of the hydrogen gas detected by the humidity sensor 42 (anode humidity Ha) and the load current I. The flow rate controller 78 regulates the flow rate of the air by controlling the compressor 48 for achieving the desired level of cathode stoichiometry SC sufficient for generating the load current I determined by the load current setting unit 60.

In the fuel cell system 70, the valve controller 74 is controlled such that the average humidity of the hydrogen gas detected by the humidity sensor 42 (anode humidity Ha) is kept in a predetermined desired range (e.g., 60 to 70%).

Specifically, when the anode humidity Ha detected by the humidity sensor 42 increases, the valve controller 76 opens the switching valve 74 for discharging the exhaust gas directly to the outside, i.e., through the bypass passage 72. The water produced at the cathode 26 is smoothly discharged to the outside, and thus, the humidity at the cathode 26 decreases. Consequently, the amount water diffused from the cathode 26 to the anode 24 decreases, and the anode humidity Ha is regulated to the optimum value for preventing water condensation. When the anode humidity Ha decreases below a predetermined value, the switching valve 74 is closed, and the exhaust gas discharged from the cathode 26 is supplied to the humidifier 52. The humidifier 52 uses the water in the exhaust gas for humidifying the air supplied to the cathode 26. The water is diffused from the cathode 26 to the anode 24. In this manner, the anode humidity Ha is maintained in the desired range.

As described above, the valve controller 76 is used to open or close the switching valve 74. The opening degree of the switching valve 74 may be adjusted depending on the humidity of the hydrogen gas, and the ratio of the exhaust gas passing through the humidifier 52 and the exhaust gas passing through the bypass passage 72 may be adjusted.

In the first and second embodiments, the humidity sensor 42 connected to the circulation passage 40 is used for directly detecting the humidity of the hydrogen gas. The flow rate of the air is regulated based on the detected value. In an alternative embodiment, the humidity at the anode 24 may be regulated without the humidity sensor 42 such that water condensation does not occur.

Specifically, at every level of possible load current (e.g., at interval of 0.1A), power generation performance of the fuel cell stack 22 is measured by changing various conditions such as the humidity at the anode 24, the humidity at the cathode 26 (the amount of water supplied to the cathode 26), the pressure, the flow rate, and the temperature of the hydrogen gas and the air for determining the optimum condition for carrying out the efficient power generation reliably without the water condensation. Namely, the optimum power generation condition depending on the level of the load current is determined. The data table of the optimum power generation condition (relationship between the measured pressure, flow rate, temperature, and the optimum control values) is used to determine the control values without detecting the humidity for controlling the fuel cell stack 22 to carry out the optimum power generation.

The optimum power generating condition during the significant change in the load current is also determined. For example, the relationship between the measured pressure, flow rate, temperature, and the change of optimum control values per unit time are programmed, and the fuel cell stack 22 is controlled according to the program to carry out the optimum power generation.

Figure 6:
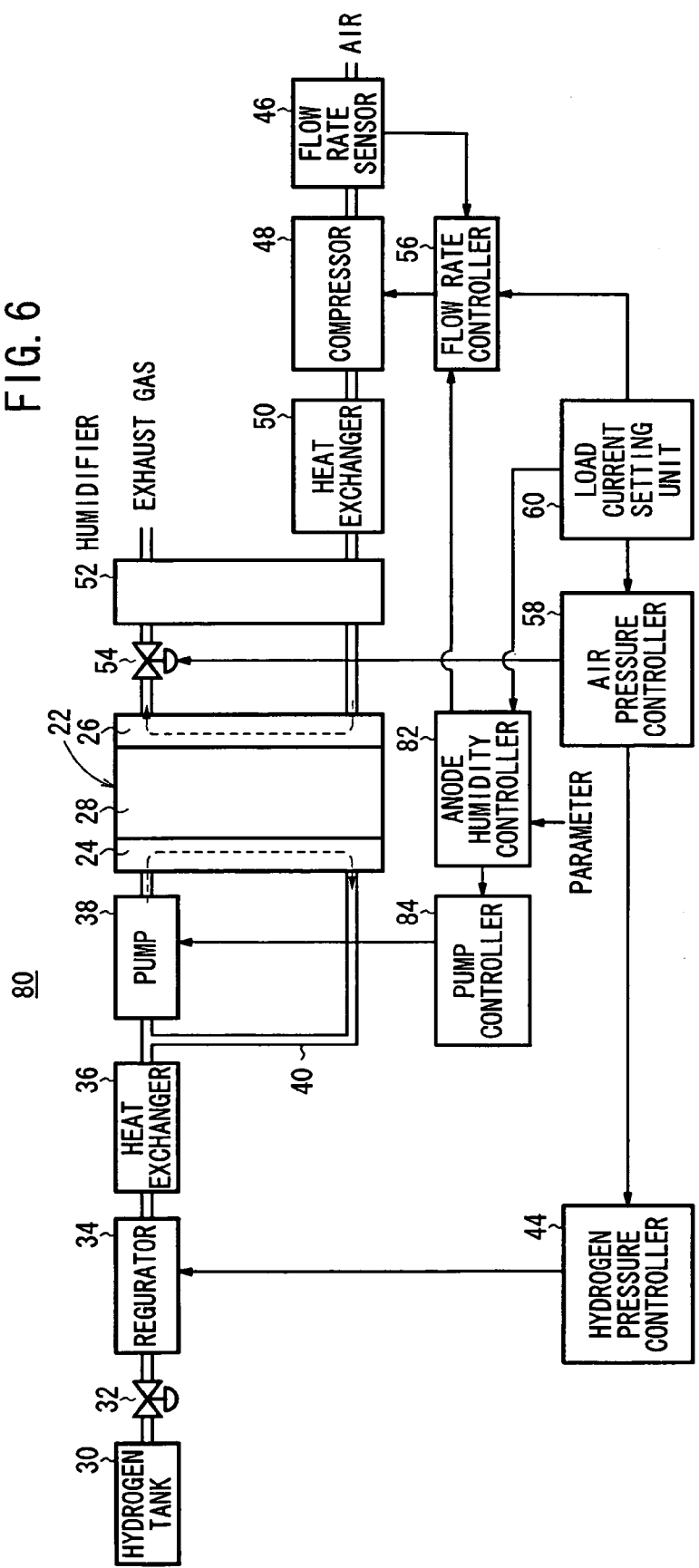
FIG. 6 is a block diagram showing a fuel cell system according to a third embodiment of the present invention.

FIG. 6 is a view showing a fuel cell system 80 according to a third embodiment of the present invention. The fuel cell system 80 has substantially the same structure as the fuel cell system 20 according to the first embodiment, but differs from the fuel cell system 20 in that the fuel cell system 80 does not include the humidity sensor 42 shown in FIG. 1. The constituent elements that are identical to those of the fuel cell system 20 shown in FIG. 1 are labeled with the same reference numeral, and description thereof will be omitted.

The anode humidity controller 82 uses a data table for controlling the humidity of at the anode 24. The data table includes relationship between the level of the load current determined by the load current setting unit 60, and the required flow rate of the air determined by the flow rate controller 56, the pressure and the temperature of the air and the hydrogen gas or the like, i.e., the optimum operating condition in which water condensation does not occur at the anode 24. Parameters such as the pressure, and the temperature can be obtained by sensors in the fuel cell system 80.

After the desired load current is determined, according to the data table, the anode humidity controller 82 supplies the flow rate data of the air which does not cause water condensation to the flow rate controller 56 for operating the compressor 48, and supplies the flow rate data of the hydrogen gas which does not cause water condensation to the pump controller 84 for operating the pump 38. In this manner, the fuel cell stack 22 can carry out the efficient operation stably.

Figure 7:
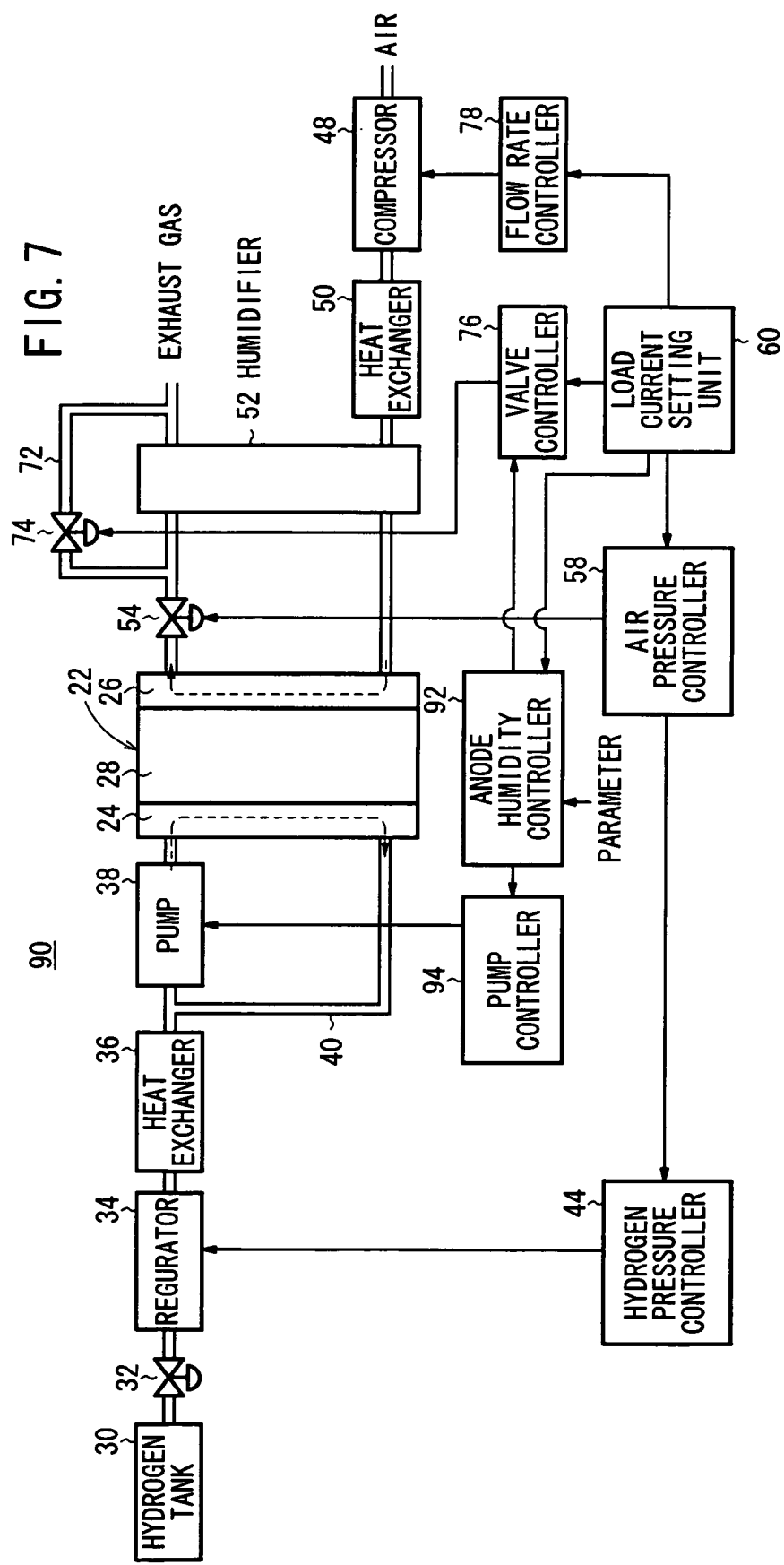
FIG. 7 is a block diagram showing a fuel cell system according to a fourth embodiment of the present invention.

FIG. 7 is a view showing a fuel cell system 90 according to a fourth embodiment of the present invention. The fuel cell system 90 has substantially the same structure as the fuel cell system 70 according to the second embodiment, but differs from the fuel cell system 70 in that the fuel cell system 90 does not include the humidity sensor 42 shown in FIG. 5. The constituent elements that are identical to those of the fuel cell system 70 shown in FIG. 5 are labeled with the same reference numeral, and description thereof will be omitted.

The anode humidity controller 92 uses a data table for controlling the humidity of at the anode 24. The data table includes relationship between the level of the load current determined by the load current setting unit 60, and the switching cycle of the switching valve 74 determined by the valve controller 76, the required flow rate of the hydrogen gas determined by the pump controller 94 for controlling the pump 94, and the pressure and the temperature of the air and the hydrogen gas or the like, i.e., the optimum operating condition in which water condensation does not occur at the anode 24. For example, the parameter of the switching cycle is determined by the valve controller 76 based on the required humidity at the cathode 26. The humidity at the cathode 26 is regulated by supplying the air to the humidifier 52.

After the desired load current is determined, according to the data table, the anode humidity controller 92 supplies the data of the switching cycle which does not cause water condensation to the valve controller 76 for opening and closing the switching valve 74, and supplies the flow rate data of the hydrogen gas to the pump controller 94 for operating the pump 38. Thus, the fuel cell stack 22 can carry out the stable power generation.

As described above, in the first through fourth embodiments, the water produced at the cathode 26 in the power generation is diffused toward the anode 24. The hydrogen gas is suitably humidified without causing the water condensation. Thus, the fuel cell stack 22 can carry out the power generation in the optimized operating condition. The electrical energy supplied to the load can be generated efficiently.

Though the water is diffused toward the anode 24 for humidifying the hydrogen gas, the water condensation does not occur at the anode 24. It is not required to discharge the redundant water from the anode side together with the hydrogen gas. Thus, the hydrogen gas is utilized efficiently used in the power generation.

A humidity meter or a dew point meter is used as the humidity sensor 42. When the dew point meter is used, since the dew point and the relative humidity has the direct relationship, the measured due point is appropriately converted into the value of the humidity. According to the present invention, it is also preferable that the dew point at the anode 24 is regulated based on the detection value obtained by the humidity sensor 42.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising a fuel cell having an anode and a cathode, wherein a hydrogen-containing gas is supplied to said anode and an oxygen-containing gas is supplied to said cathode for generating a load current, said fuel cell system further comprising:
    a humidifier for humidifying said oxygen-containing gas supplied to said cathode of said fuel cell; and
    an oxygen-containing gas flow rate controller for controlling a flow rate of said oxygen-containing gas supplied to said cathode such that humidity of said hydrogen-containing gas is maintained within a predetermined range less than 100%;
    a humidity sensor for detecting humidity of said hydrogen-containing gas; and
    a circulation passage for circulating said hydrogen-containing gas to supply said hydrogen-containing gas to said anode;
    wherein said humidity sensor is disposed in said circulation passage; and
    said fuel cell system is free of a humidifier for humidifying said hydrogen-containing gas supplied on an anode side of said fuel cell.

2. A fuel cell system according to claim 1, further comprising:
    a hydrogen-containing gas flow rate controller,
    wherein said oxygen-containing gas flow rate controller controls a flow rate of said oxygen-containing gas supplied to said cathode and said hydrogen-containing gas flow rate controller controls a flow rate of said hydrogen-containing gas supplied to said anode such that humidity of said hydrogen-containing gas is maintained within a predetermined range less than 100%.

3. A fuel cell system comprising a fuel cell having an anode and a cathode, wherein a hydrogen-containing gas is supplied to said anode and an oxygen-containing gas is supplied to said cathode for generating a load current, said fuel cell system further comprising:
    a humidifier for humidifying said oxygen-containing gas supplied to said cathode of said fuel cell; and
    a switching valve;
    a bypass passage as a passage of said oxygen-containing gas bypassing said humidifier;
    a valve controller for controlling said switching valve such that said oxygen-containing gas selectively passes through said humidifier or said bypass passage, for maintaining humidity of said hydrogen-containing gas within a predetermined range less than 100%;
    a humidity sensor for detecting humidity of said hydrogen-containing gas; and
    a circulation passage for circulating said hydrogen-containing gas to supply said hydrogen-containing gas to said anode;
    wherein said humidity sensor is disposed in said circulation passage;
    said valve controller controls a flow rate of said oxygen-containing gas passing through said humidifier or said bypass passage for maintaining humidity of said hydrogen-containing gas within a predetermined range less than 100% ; and
    said fuel cell system is free of a humidifier for humidifying said hydrogen-containing gas supplied on an anode side of said fuel cell.

4. A fuel cell system according to claim 3, further comprising:
    a hydrogen-containing gas flow rate controller for controlling a flow rate of said hydrogen-containing gas circulating through said circulation passage;
    wherein said valve controller controls a flow rate of said oxygen-containing gas supplied to said cathode and said hydrogen-containing gas flow rate controller controls a flow rate of said hydrogen-containing gas supplied to said anode such that humidity of said hydrogen-containing gas is maintained within a predetermined range less than 100%.

5. A method of operating a fuel cell system comprising a fuel cell having an anode and a cathode, wherein a hydrogen-containing gas is supplied to said anode and an oxygen-containing gas is supplied to said cathode for generating a load current, said method comprising the steps of:
    humidifying said oxygen-containing gas supplied to said cathode of said fuel cell;
    controlling a flow rate of said oxygen-containing gas supplied to said cathode such that humidity of said hydrogen-containing gas is maintained within a predetermined range less than 100%;
    detecting the humidity of said hydrogen-containing gas with a humidity sensor; and
    providing a circulation passage to circulate said hydrogen-containing gas to supply said hydrogen-containing gas to said anode;
    wherein said humidity sensor is disposed in said circulation passage; and
    said fuel cell system is free of a humidifier for humidifying said hydrogen-containing gas supplied on an anode side of said fuel cell.

6. The method of claim 5, further comprising the steps of:
    maintaining humidity of said hydrogen-containing gas within a predetermined range less than 100% by controlling the flow rate of said oxygen-containing gas supplied to said cathode and a flow rate of said hydrogen-containing gas supplied to said anode.

7. A method of operating a fuel cell system comprising a fuel cell having an anode and a cathode, wherein a hydrogen-containing gas is supplied to said anode and an oxygen-containing gas is supplied to said cathode for generating a load current, said method comprising the steps of:
    humidifying said oxygen-containing gas supplied to said cathode of said fuel cell with a humidifier;
    providing a bypass passage as a passage of said oxygen-containing gas bypassing said humidifier;
    controlling a switching valve such that said oxygen-containing gas selectively passes through said humidifier or said bypass passage, for maintaining humidity of said hydrogen-containing gas within a predetermined range less than 100%;

detecting the humidity of said hydrogen-containing gas with a humidity sensor and maintaining the humidity of said hydrogen-containing gas within a predetermined range less than 100% by controlling the flow rate of said oxygen-containing-gas passing through said humidifier or said bypass passage; and providing a circulation passage to circulate said hydrogen-containing gas to supply said hydrogen-containing gas to said anode;

wherein said humidity sensor is disposed in said circulation passage; and said fuel cell system is free of a humidifier for humidifying said hydrogen-containing gas supplied on an anode side of said fuel cell.

8. The method of claim 7, further comprising the steps of:

controlling a flow rate of said hydrogen-containing gas circulating through said circulation passage; and maintaining humidity of said hydrogen-containing gas within a predetermined range less than 100% by controlling a flow rate of said oxygen-containing gas supplied to said cathode and controlling a flow rate of said hydrogen-containing gas supplied to said anode.

* * * * *